W. R. McGINNIS.
APPARATUS FOR THE RECOVERY OF GASOLENE FROM CASING HEAD GAS IN OIL WELLS.
APPLICATION FILED MAY 14, 1917.
1,328,680. Patented Jan. 20, 1920.
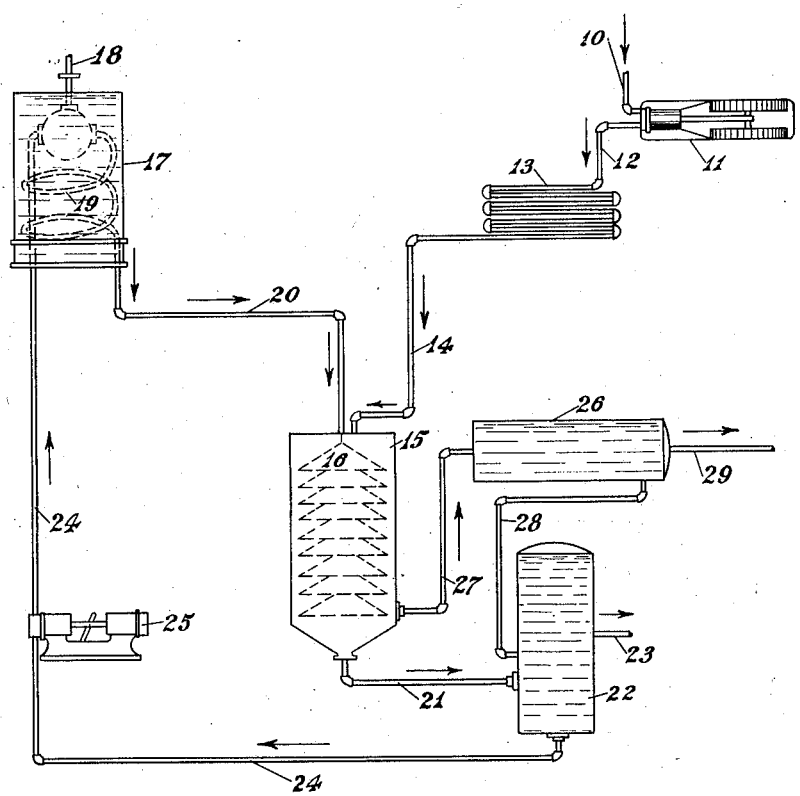
INVENTOR
W. R. M<sup>c</sup>Ginnis
BY
James L. Hopkins,
ATTORNEY

UNITED STATES PATENT OFFICE.

WALTER R. McGINNIS, OF ST. LOUIS, MISSOURI, ASSIGNOR TO PILSBRY-BECKER ENGINEERING & SUPPLY COMPANY, OF ST. LOUIS, MISSOURI, A CORPORATION OF MISSOURI.

APPARATUS FOR THE RECOVERY OF GASOLENE FROM CASING-HEAD GAS IN OIL-WELLS.

1,328,680.     Specification of Letters Patent.     Patented Jan. 20, 1920.

Application filed May 14, 1917. Serial No. 168,436.

*To all whom it may concern:*

Be it known that I, WALTER R. McGINNIS, a citizen of the United States, residing at the city of St. Louis, State of Missouri, have invented certain new and useful Improvements in Apparatus for the Recovery of Gasolene from Casing-Head Gas in Oil-Wells, of which the following is a specification, reference being had therein to the accompanying drawing.

My invention relates to an improved method of and apparatus for the recovery of gasolene from casing-head gas in oil-wells, and has for its object to effect the conversion of said gas to gasolene by means of the series of operations hereinafter described, and by the use of an apparatus simple and inexpensive in character, as described below in detail.

The drawing is a diagrammatic view of an apparatus embodying my invention, with which the method of my invention may be practised.

The gas to be converted is conducted by the pipe 10 from the source of supply (the oil-well casing) to a compressor 11, wherein it is compressed to such degree as is desirable. The compressed gas is then conducted by the line pipe 12 to the cooling-coil 13, wherein its temperature is lowered, coil 13 being subjected to contact with a cooling medium. Thence the gas is fed by the line-pipe 14 to a scrubber or converter 15, the interior of which is provided with a series of baffles 16 as shown.

A cooling liquid is fed to the cooler 17 through the supply-pipe 18, a refrigerating coil 19 being contained in said cooler 17. The cooled liquid is then fed to the converter 15 through the line-pipe 20, and the liquid is then flowed in a thin film over the surfaces of the baffles 16.

The contact of the gas with the cooling liquid in the converter 15 results in the formation of gasolene, held in suspension in the mass of cooling liquid, which accumulates at the bottom of the converter 15. That mixture is drawn off by the drain-pipe 21 to the primary separator 22, wherein the gasolene automatically rises to the surface of the liquid and flows off through the outlet-pipe 23; the heavier cooling liquid is drawn from the bottom of the separator 22 by the line-pipe 24, and the liquid is forced into the cooler 17 by means of the pump 25 operating on the line-pipe 24. The returned liquid is again cooled in the cooler 17 and returned to the converter 15, through the line-pipe 20.

The gas in the converter 15 which remains free after contact with the cooling liquid is carried over to the secondary separator 26 by the escape-pipe 27. Any particles of gasolene or cooling liquid carried to the secondary separator 26 in this manner will fall to the bottom of said separator 26 and are carried over to the primary separator 22 by the drain-pipe 28. The free gas in the separator 26 is drawn off by the outlet pipe 29 for whatever use may be desired.

This apparatus is adapted to be employed in practising the method of the invention which is the subject-matter of my co-pending application for patent, Serial No. 242,809, filed July 1, 1918. The degree of compression to be employed in the use of this apparatus varies from 40 to 75 pounds pressure to the square inch in excess of atmospheric pressure, and will be varied in accordance with the composition of the gas; a pressure of 60 pounds is effective under most conditions and with the average run of gas.

The cooling liquid is always to be employed at a temperature below or slightly above freezing; in practice, from 2° to 5° Fahrenheit has been found to produce the best results.

As a scrubbing liquid water may be employed, although non-viscous oil, or other freely flowing liquid may be used.

Having thus described my invention, what I claim as new and desire to have secured to me by the grant of Letters Patent, is—

The apparatus for recovering gasolene from casing-head gas comprising a compressor; a cooling coil connected to said compressor; a converter fed from said cooling coil; a liquid-cooler; a refrigerating coil mounted in said liquid-cooler; a conduit connecting the liquid-cooler with said converter; a primary separator and a secondary separator connected to said converter and to each other; means for drawing off free gas and gasolene from said separators; and means for returning the liquid from said separators to the liquid-cooler.

In testimony whereof I hereunto affix my signature.

WALTER R. McGINNIS.